(12) United States Patent
Furuta et al.

(10) Patent No.: US 7,641,718 B2
(45) Date of Patent: Jan. 5, 2010

(54) ELECTROSTATIC PRECIPITATOR

(75) Inventors: Masatoshi Furuta, Kakamigahara (JP); Shigenobu Ohkura, Kasugai (JP)

(73) Assignees: Zesu Giko Co., Ltd, Gifu (JP); Hidec Co., Ltd, Aichi (JP)

( * ) Notice: Subject to any disclaimer, the term of this patent is extended or adjusted under 35 U.S.C. 154(b) by 235 days.

(21) Appl. No.: 11/912,115

(22) PCT Filed: Jun. 13, 2005

(86) PCT No.: PCT/JP2005/010778
§ 371 (c)(1),
(2), (4) Date: Oct. 19, 2007

(87) PCT Pub. No.: WO2006/134627
PCT Pub. Date: Dec. 21, 2006

(65) Prior Publication Data
US 2009/0056551 A1    Mar. 5, 2009

(51) Int. Cl.
*B03C 3/10* (2006.01)
(52) U.S. Cl. .................. 96/39; 95/75; 95/77; 96/44; 96/86; 96/87; 96/94; 96/97
(58) Field of Classification Search .............. 96/39, 96/43, 44, 46, 47, 50, 86, 87, 94, 97; 95/75, 95/77
See application file for complete search history.

(56) References Cited

U.S. PATENT DOCUMENTS

| | | | |
|---|---|---|---|
| 640,694 A | * | 1/1900 | Otto ............... 422/186.07 |
| 3,912,467 A | * | 10/1975 | Trump et al. ............... 96/94 |
| 3,958,962 A | * | 5/1976 | Hayashi ............... 96/97 |
| 5,084,077 A | * | 1/1992 | Junker et al. ............... 96/39 |
| 5,110,324 A | * | 5/1992 | Testone et al. ............... 95/73 |
| 5,380,355 A | * | 1/1995 | Brothers ............... 96/64 |
| 5,429,669 A | * | 7/1995 | Chang ............... 96/51 |
| 6,958,088 B1 | * | 10/2005 | Moriyama ............... 96/39 |
| 7,297,185 B2 | * | 11/2007 | Furuta et al. ............... 96/39 |
| 2005/0199125 A1 | * | 9/2005 | Taylor et al. ............... 96/39 |

FOREIGN PATENT DOCUMENTS

| | | | | |
|---|---|---|---|---|
| JP | 38-18198 B | * | 9/1963 | |
| JP | 4-150961 A | * | 5/1992 | ............... 96/94 |
| JP | 2003-126729 A | * | 5/2003 | |
| JP | 2004-141826 A | * | 5/2004 | |

* cited by examiner

*Primary Examiner*—Richard L Chiesa
(74) *Attorney, Agent, or Firm*—Apex Juris, pllc; Tracy M Heims

(57) ABSTRACT

The electrostatic precipitator (1) includes the housing (8) having the air duct (7) for communicating between the inlet (4) for sucking the contaminated air (3) and the outlet (6) for discharging the cleaned air (5), the air flow generator (10) generating the air flow (9) in the air duct (7), the collecting section (14) having a plurality of adsorption plates (13) rotating in accordance with the adsorption shaft (11), and the discharge section (24) equipped with the charging plate (20) having the discharge surface (21) opposing the adsorption surface (12) of the adsorption plate (13) and a plurality of the discharge electrodes (19) provided at the edge (22) of the charging plate (20) opposite the suction inlet. The fine particles (2) contained in the contaminated air (3) are charged by the corona discharge (CD) generated from the pointed ends (23) of the discharge electrodes (19) and collected by using the Coulomb force while varying the relative positional relationship between fine particles (2) and the adsorption surface (12) at all times by the rotating of the adsorption plate (13).

4 Claims, 4 Drawing Sheets

ELECTROSTATIC PRECIPITATOR

This application is the national stage of International Application No. PCT/JP2005/010778, filed on Jun. 13, 2005.

BACKGROUND OF THE INVENTION

1. Field of the Invention

The present invention relates to an electrostatic precipitator, in particular an electrostatic precipitator that is capable of collecting fine particles that have been charged by corona discharge by rotating adsorption plates.

2. Description of Related Arts

Traditionally, so-called "industrial waste gases", such as exhaust from boilers at industrial installations and a large quantity of soot discharged from power stations, before their release into the atmosphere, have been on occasion subjected to an air cleaning process to remove fine particles that may pollute the atmosphere (such as mist and dust containing various powdery or oily substances and moisture from industrial waste gases). The release of industrial waste gases containing these particles directly into the atmosphere poses a serious threat to the earth environment; and recovery of these noxious substances is required by law in some countries and local governments. In urban areas, air pollution from automobile exhaust and others creates a serious condition. Some homes are equipped with and use indoor air purifiers. In many of the kitchens of restaurants, smoke generated during cooking and otherwise contaminated air are cleansed by air purifiers before being released outside.

For the dust collecting devices to recover the fine particles contained in contaminated air, the cause for air pollution and how to purify air, many types based on various principles are known. Specifically, classified based on theories of particle collection, filtration, gravity, inertia, centrifugation, electricity, and cleaning types are cited as available processes. Among them, an appropriate type is selected according to the size or type of fine particles to be collected and conditions for installation. For the efficiency of dust collection, a filtration system (by using bag filters and others) and electric systems are particularly outstanding and are therefore used widely in various areas of industry.

The theory of dust collection by an electrostatic precipitator is defined here as follows: fine particles are electrically charged by a corona discharge that is generated by a discharge electrode; and these electrically charged fine particles are drawn and collected by a dust-collecting counter electrode by using the Coulomb force. This electrostatic precipitator is characterized by notable advantages such as: 1) minimum pressure loss; 2) a large quantity gas processing capacity; and 3) a high rate of dust collection. Therefore, it is used in environments such as factories and power stations where a large quantity of contaminated air is released.

The electrostatic precipitator is commonly comprised of major structural components, i.e., a discharge electrode that is formed to have a large surface curvature, such as a needle or wire, to generate a corona discharge to charge fine particles; a collecting electrode, the counter electrode, which is formed into a plate to collect the charged particles; a rectifier to adjust the air flow in the electrostatic precipitator; a hammering device (dry type) and spray device (wet type) to separate the adhering fine particles from the dust-collecting electrode; a hopper that collects the separated particles; and attachments (an electrical power source for corona discharge and a charge control device).

The above-described hammering device is used in a dry-type electrostatic precipitator: it is used to hammer the dust-collecting electrode so that the fine particles that have been collected are shaken off and collected in the collecting means such as a hopper provided at the lower portion thereof. When a wet-type precipitator is used, the fine particles that have been collected in the dust-collecting electrode are washed off when a cleaning fluid such as water is sprayed. When a large quantity of fine particles have been collected on the particle-collecting electrode, the Coulomb force to attract the charged particles is compromised and the dust-collecting efficacy is reduced. Therefore to avert the condition in which dust is no longer collected in a steady state, the fine particles are removed from the collecting electrode by adopting a dry- and wet-type method, as described above.

More recently, on the other hand, a type in which the discharge and collecting electrodes are housed in an exchangeable cartridge is used. By using this embodiment, the cartridge is replaced after many particles have been collected on the collecting electrode (which compromises the dust-collecting efficacy), thus maintaining a steady dust-collecting efficacy. In many instances, used cartridges are subjected to a particle-removing operation in a special apparatus provided by the manufacturer so that they may be recycled. Thus, the apparatus is easily maintained, obviating the need to attach a dust-removing apparatus such as that described earlier, which contributes to down-sizing the entire apparatus and reducing production costs.

In view of the current condition described above, the applicant of the present invention invented an electrostatic precipitator that has a new structure and has filed a patent application (refer to Patent Documents 1 and 2).

[Patent Document 1]
Unexamined Japanese Patent Publication No. 2003-126729

[Patent Document 2]
Unexamined Japanese Patent Publication No. 2004-141826

SUMMARY OF THE INVENTION

Meanwhile, the dry- and wet-type electrostatic precipitators tend to be large and bulky as stated above and the sites where they can be installed are often limited to large manufacturing plants and power stations. When the cartridge format is adopted, on the other hand, a need to replace the cartridge arises every time the dust-collecting efficacy is reduced; and in an environment where a large quantity of contaminated air is to be processed at once, such an exchange operation must be conducted frequently, adding to the workload of the employees, raising the cost of exchange and ultimately resulting in an economic disadvantage. Furthermore, there is a need for an electrostatic precipitator that is compact in form and suitable for kitchens in restaurants or similar facilities and yet offers a high dust-collecting efficacy.

In particular, there is a demand for an electrostatic precipitator with a high operating rate that is capable of collecting dust at a steady rate without a marked reduction in its dust-collecting rate (dust-capturing efficacy) even when it is operated continually for a long time and with its adsorptive surface with particles in an adsorbed state can be cleansed relatively easily and in a short time so that it may be used again.

In view of the above-noted state, the present invention offers an electrostatic precipitator that is not compromised in its efficacy to collect fine particles in spite of continuous operation for a long time and is maintained easily by procedures such as cleansing.

Means to Solve the Problems

To solve the above-stated problems, the electrostatic precipitator of the present invention mainly comprises "a housing having an air duct that is formed inside for communication between an inlet for sucking contaminated air containing fine particles and an outlet for discharging resulted cleaned air after removing the fine particles, a air flow generating means for generating an air flow in the air duct for the sucking contaminated air and discharging clean air, a discharge means that is formed in the aforementioned air duct and charges by corona discharge (CD) the fine particles that are contained in the contaminated air, a collecting means that is formed in the air duct and collects using the Coulomb force fine particles that had been charged by the discharge means, and a discharge voltage supplying means that is electrically connected to the discharge means and supplies the discharge voltage that enables the CD, wherein the collecting means comprises: an adsorption shaft that bridges the air duct perpendicular to a direction of the air flow, a plurality of adsorption plates that are generally discoid, installed on the adsorption shaft while the adsorption surfaces oppose each other, adsorb and collect the fine particles on the adsorption surface by using the Coulomb force, and an adsorption plate rotating means that is connected to one end of the adsorption shaft and rotates the adsorption plates along the adsorption shaft; and the discharge means comprises: a discharge axis that is electrically connected to the discharge voltage supplying means, a plurality of charging plates that are supported by the discharge axis, inserted between a pair of the adsorption plates that oppose each other, has discharge surfaces approaching the adsorption surfaces of the adsorption plates, and arranged while being electrically insulated from the adsorption plates; and a plurality of discharging electrodes that are fixed and project from the opposing edge of the inlet of the charging plate to the inlet and have pointed ends that are formed at the ends."

For the fine particles contained in contaminated air here are exemplified by solid particles that are contained in industrial waste gases discharged from factories and other facilities and automobile exhaust gases and mist-like gases that include a large quantity of oily substances and liquids being released from restaurant kitchens and similar facilities, which correspond to the so-called "floating particles" in gases. The air-current generating means generates an air flow (air current) in the air duct: for example, by operating a propeller that is connected to a driving device such as a motor, an air current is created in association with the rotation of the propeller. By varying the diameter of the propeller that is used here or the number of rotations of the motor for driving, the amount of the airflow or flow velocity (flow rate) may be adjusted as desired.

For the collecting means, the fine particles in the contaminated air are electrically charged by a discharge mechanism (to be elaborated later); and while in a charged state, are electrically adsorbed and collected by the adsorption surface of the adsorption plates at the opposing electrode with the aid of the Coulomb force. In this instance, the adsorption plates that comprise the collecting means rotate axially along with the adsorptive shaft by means of a plate rotating means. Thus, the positional relationship between the fine particles contained in the contaminated air and the adsorptive surface undergoes changes by the minute. Accordingly, the fine particles that are collected by the Coulomb force are generally evenly adsorbed over the entire adsorptive surface instead of being localized in specific areas on the adsorption surfaces of the adsorption plates.

The discharge means is intended to supply a corona discharge to charge the fine particles that are contained in the contaminated air. It comprises mainly a discharge shaft that is connected to the discharge voltage supplying means, charging plates and a discharge electrode. The corona discharge occurs readily at the pointed section. In the present invention, therefore, a discharge electrode that has a pointed end section at the end is used. Then, this pointed section is arranged to oppose the airflow or to face the inlet. Each charging plate between the adsorption plates with a set interval in the direction of the width of the air duct, while a plurality of discharging electrodes are arranged along the edge opposing the suction inlet in the direction of the height of the housing. Thus almost all of the contaminated air that has been adsorbed through the inlet passes near the discharge electrode where a corona discharge has occurred. Consequently, the fine particles that are contained in contaminated air are effectively charged by this corona discharge. The materials used to form the discharge electrode are not specified here, but it is necessary that they are of a type that the pointed ends will resist melting and will retain their sharp points in spite of the high temperatures associated with corona discharges. At the same time they are associated with outstanding electroconductivity for effective corona discharges. For these reasons, hard materials such as tungsten or tungsten compounds should be used.

Thus by employing the electrostatic precipitator of the present invention, a corona discharge is generated by the discharge voltage that is provided by the discharge voltage supplying means at the pointed ends of the discharge electrodes that constitute a discharge means. At this occasion, contaminated air is taken through the inlet in the air duct and passes by some of the plurality of discharge electrodes that are arranged crisscrossing the outlet. Thus fine particles in the contaminated air are exposed to a corona discharge, which charges these particles (i.e., a positive charge). The fine particles thus charged reach the space between the charging and adsorptive plates. By this moment, the discharge voltage supplying means has made the charging plates share the electrical charge of the charged particles, the particles are repelled by the Coulomb force as they approach the discharge surface of the charging plates and tend to move away from the discharge surface.

On the other hand, the adsorption plate has an electrical potential opposite that of the charged particles and it tends to adsorb these particles with the aid of the Coulomb force. Consequently, the particles that had been brought between the charging and absorption plates come under the repelling and absorptive effects, drawn to the absorption surface of the adsorption plate and collected. At this moment, the absorption plate is rotated by the plate rotating means that is connected to the adsorption shaft. Therefore, the positional relationship of the adsorption surface of the adsorption plate with the particles constantly changes, keeping the particles from accumulating in any specific site on the adsorption surface. In other words, the efficiency of adsorption and collection by the Coulomb force is not reduced by accumulated particles and the dust-collecting efficacy of the electrostatic precipitator is not compromised in a short period.

Furthermore, in addition to the embodiment described above, the electrostatic precipitator of the present invention may have the following embodiment: "the pointed end of the discharge electrode is set back at the side of the adsorption shaft away from the plate edge of the adsorption plate."

Thus, in the electrostatic precipitator of the present invention, the pointed ends of the discharge electrode are arranged away from the plate edge of the adsorption plate and toward the side of the adsorption shaft. Specifically, contaminated air, which has passed through the inlet, reaches between a pair of opposing adsorption plates and arrives at the charging plate where the discharge electrode is located. Because of the electrical field that has been formed by a supply of the discharge voltage from the pointed ends of the discharge electrode, a corona discharge is generated toward the adsorption surface of the adsorption plate. Thus, the contaminated air that has passed between the adsorption plates is exposed to this corona discharge. At this time, the pointed means is set back on the side of the adsorption shaft, the particles that have been charged by the corona discharge are surrounded by the adsorption and charging plates. Consequently, the repulsive and adsorptive actions by the plates expedite trapping of the fine particles.

In addition to the structures defined above, the electrostatic precipitator of the present invention may have the following features: "the air duct is sectioned by a first segment that is connected with the air duct and contains the discharge means and collecting means; a second segment to which the clean air that has been cleaned in the first segment is sent; and a third segment that houses the air flow generating means and exhausts the clean air sent from the second partition through the outlet."

Thus, in the electrostatic precipitator of the present invention, the air duct inside the housing is divided into 3 sections. When contaminated air is to be purified by using this electrostatic precipitator, it is first introduced to the first section where the discharge and collecting means are located. In this first section, the fine particles are collected by means of the Coulomb force. Then, passing through the second and third sections, the cleansed air is released through the outlet. Specifically, to prevent the direct release, together with the clean air, of the fine particles that have been scattered and aggregated by the centrifugal action from the adsorption plates that rotate in the first section, the second section and the third sections that houses the airflow generating means are created. Thus it became possible to improve the purity of the cleaned air that is released from the outlet.

Furthermore, in the electrostatic precipitator of the present invention, in addition to the embodiments shown above, may have the following features: "the pointed ends of the discharge electrode are arranged, while maintaining an equal distance from the adsorption surfaces of the pair of the adsorption plates with the pointed ends."

Thus, in the electrostatic precipitator of the present invention, the pointed ends of the discharge electrode are arranged with an equal distance from the absorption surface of each opposing absorption plate. In this embodiment, the condition for generating a corona discharge varies, depending on the distance from the pointed ends to absorption plates of different potentials. In other words, the smaller the distance between the pointed ends and the absorption plate, the more readily is the corona discharge generated. By equating the distance to the pointed ends of the discharge electrode means that is located between the absorption plates, the corona discharge is uniformly distributed on the absorption surface of both absorption plates. In an example for such a embodiment, a hole may be made where the discharge electrode may be inserted in the discharge plate and by inserting one end of the discharge electrode (corresponding to the side opposite the pointed end), the charge plate and the discharge electrode means may be built as a single unit, which makes it possible to maintain an equal distance from the absorption surface.

In the electrostatic precipitator of the present invention, for the means to charge fine particles with a corona discharge, discharge electrodes with pointed ends, which are arranged at the charge plate and opposing edges of the charge plate toward the intake, are used. Through this embodiment, the fine particles contained in contaminated air can be effectively charged. Because the charged particles can be collected by the rotating adsorption plates while the particle absorption surface undergoes relative changes, fine particles do not accumulate in any specific place on the absorption surface. Consequently, the likelihood of attenuating the Coulomb force and reducing the collection efficacy is unlikely. Furthermore, by adopting a embodiment in which only the adsorption plate is rotated, the structure of the electrostatic precipitator itself may be simplified and the maintenance (cleansing) operation of removing fine particles from the adsorptive surface can be conducted more simply than by the conventional method. In addition, the pointed ends of the discharge electrode are arranged equidistance from the pair of adsorption plates so that the corona discharge does not occur unevenly on one adsorption plate.

BRIEF EXPLANATION OF THE DRAWINGS

The above and other objects of the present invention will become readily apparent by reference to the following detailed description when considered in conjunction with the accompanying drawings wherein.

PREFERRED EMBODIMENT OF THE PRESENT INVENTION

Preferred Embodiment of the Invention

Figure 1:
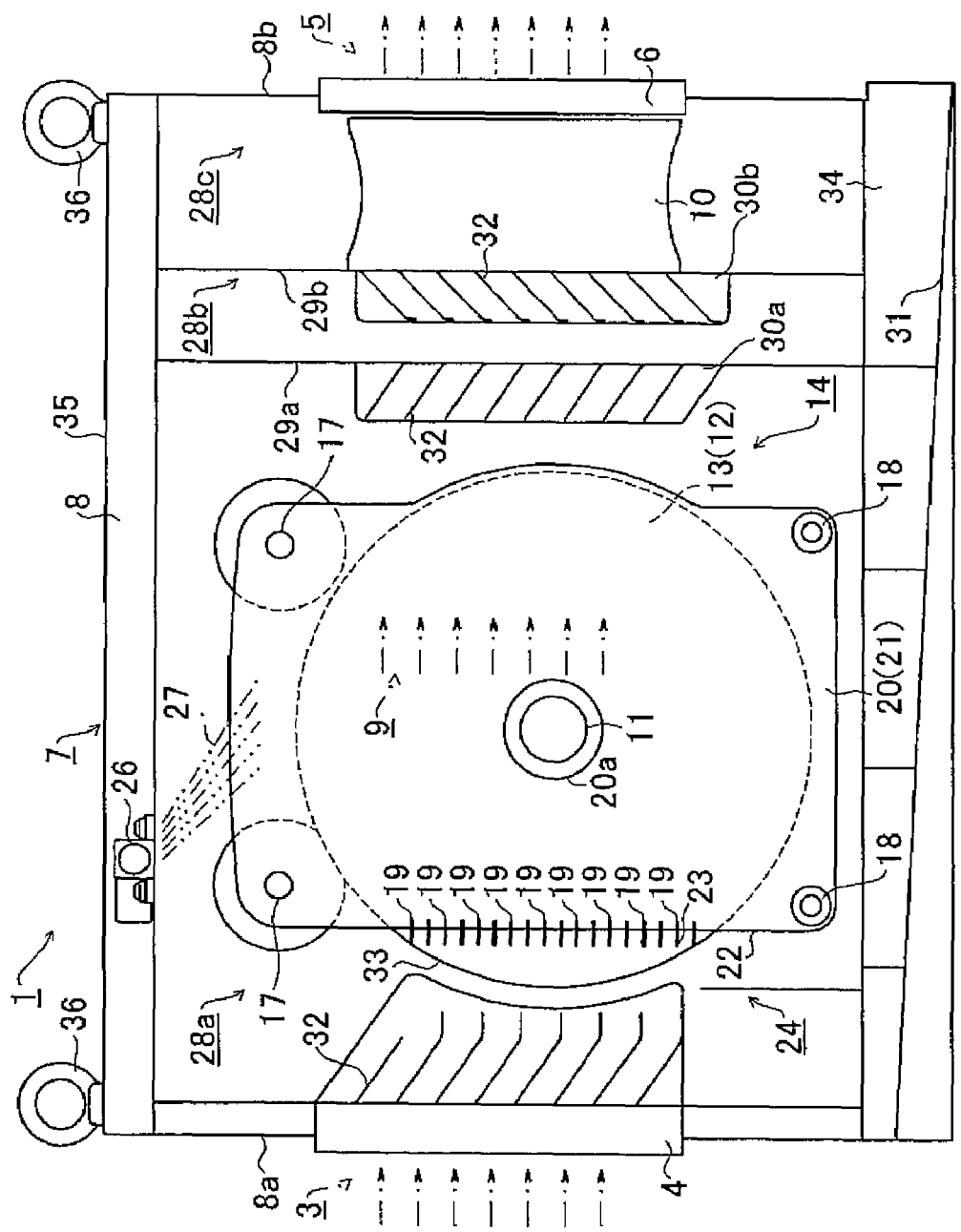
FIG. 1 is an explanation view showing the internal structure of the electrostatic precipitator viewed from the side thereof.
Figure 2:
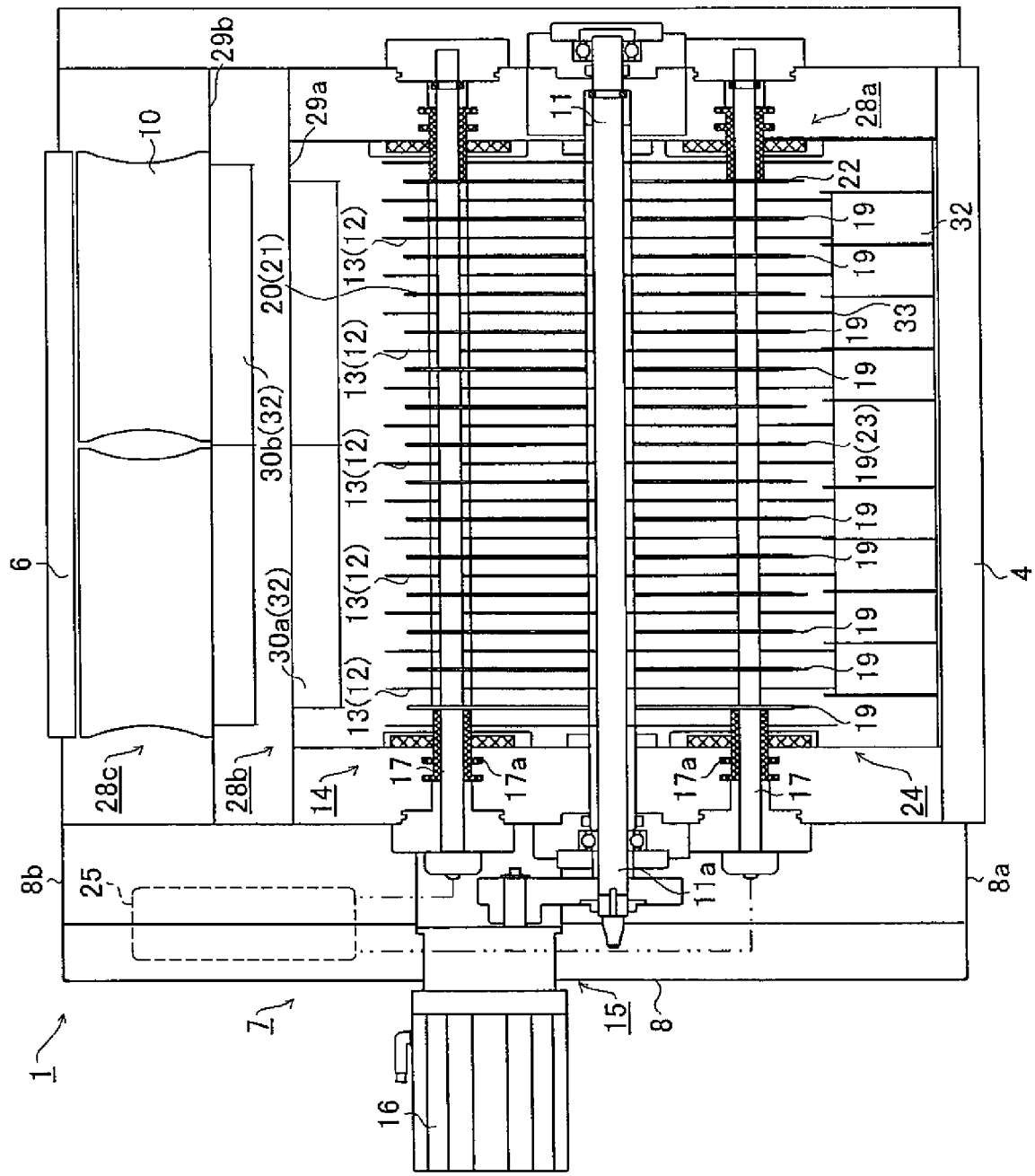
FIG. 2 is an explanation view showing the internal structure of the electrostatic precipitator viewed from the top thereof.
Figure 3:
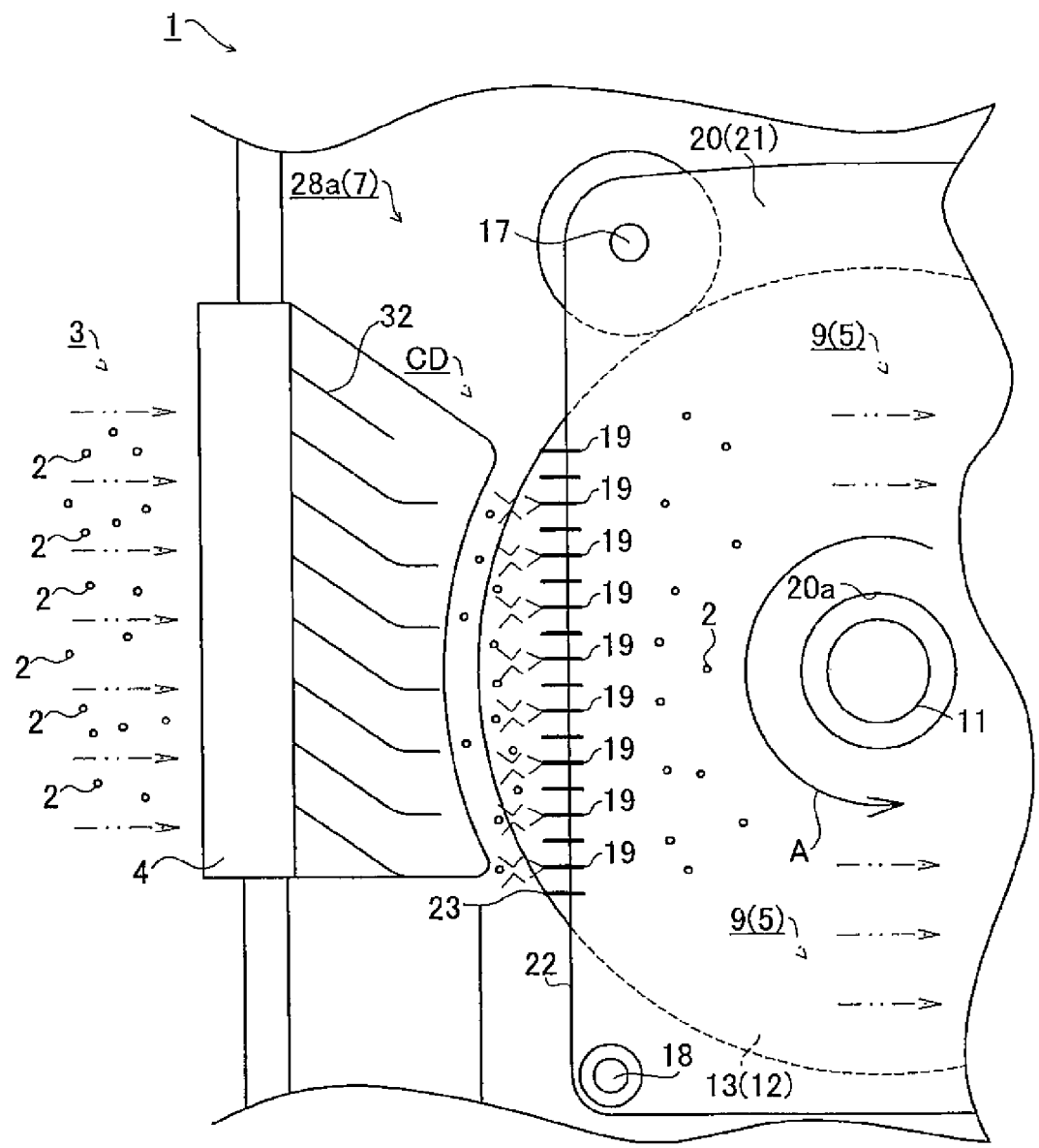
FIG. 3 is an explanation view illustrating the structures of the discharge electrode means, charging plates and adsorption plates.
Figure 4:
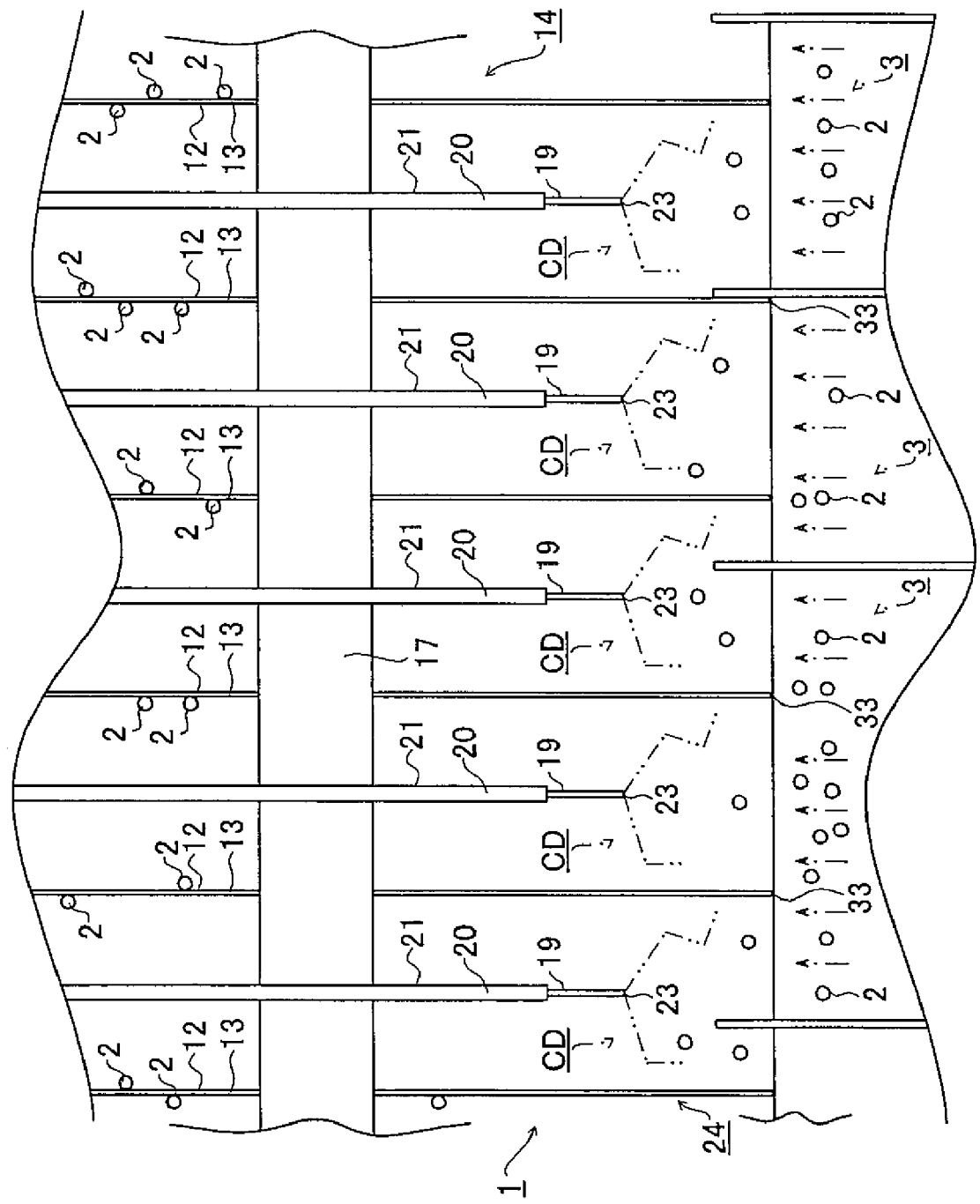
FIG. 4 is an explanation view showing the movement of the charged particles.

An electrostatic precipitator 1, one embodiment of the present invention, is described below with reference to FIGS. 1 through 4. Here, FIG. 1 is an explanation view showing the internal structure of the electrostatic precipitator of this type that is viewed from the side thereof. FIG. 2 is an explanation view showing the internal structure of electrostatic precipitator 1 that is viewed from the top thereof. FIG. 3 is an explanation view showing the structures of the discharge electrode, charging plates and adsorption plates. FIG. 4. is an explanation view illustrating the movements of charged particles.

An electrostatic precipitator of this embodiment mainly comprises a housing 8 inside of which an air duct 7 communicates between an inlet 4 sucking a contaminated air 3 that contains fine particles 2 and an outlet 6 discharging clean air 5 that has been cleaned through the electrostatic precipitator 1; an air flow generator 10 that is located near the outlet 6 on a downstream side (corresponding to the right side of FIG. 1) of the air duct 7 and has a rotary fan and a motor to rotate the rotary fan (neither shown in the figure) that generate an air current (air flow 9) in the air duct 7 to suck in the contaminated air 3 through the inlet 4 and discharge the cleaned air 5 through the outlet 6; a collecting section 14 having generally a rod-shaped adsorption shaft 11 that runs horizontally for the width of the air duct 7 (corresponding to the right and left sides of FIG. 2) and axially supported but capable of rotary motions and a plurality of adsorption plates 13 that are discoid and attached to the adsorption shaft 11 while adsorption surfaces 12 face each other; a plate rotation motor 16 that is connected through a drive-transmission mechanism 15, such as a driving gear to one end 11a of the adsorption shaft 11 that is axially attached to the housing 8; a plurality of generally square charging plates 20 that are arranged in a direction of the width of the electrostatic precipitator 1 while being electrically insulated from the collecting section 14 and are held by a pair each of the discharge shafts 17 and charging plate supporting shafts 18, with a discharge surface 21 closely facing the adsorption surface 12 of the adsorption plate 13; a discharge section 24 having multiple discharge electrodes 19 with pointed ends 23 at their tips that project from an opposing edge 22 of the inlet (corresponding to the left side of FIG. 1) of charging plate 20 toward inlet 4; a discharge voltage supply section 25 that is electrically connected to a discharge axis 17 of the discharge section 24 and supplies the discharge voltage so that a corona discharge (CD) will occur at a sharp needle-like pointed ends 23; and washing fluid injection section 26 that is installed in the upper part inside air duct 7 and injects washing fluid 27 on each adsorption surface 12 of adsorption plates 13 to wash off fine particles 2 from the adsorptive surfaces 12.

In this embodiment, the air flow generator 10 corresponds to the air flow generation means, the plate-rotating motor 16 to the plate rotating means, the collecting section 14 to the collecting means, the discharge section 24 to the discharge means, and the discharge voltage supply section 25 to the discharge voltage supply means, all of the present invention.

The electrostatic precipitator 1 of this embodiment is explained in further detail below. The housing 8 that is encased in a generally rectangular box has the inlet 4 that opens to a front side 8a of the housing and has the open outlet 6 at a housing back 8b opposite a housing front 8a. The housing contains air duct 7 that connects the inlet 4 and the outlet 6. Starting at the inlet 4 and ending at the outlet 6, this air duct 7 is divided into 3 sections, 28a, 28b, and 28c. To explain further, it comprises first section 28a where the contaminated air taken in through the inlet 4 is guided to the discharge section 24 then to the collecting section 14; the second section 28b, located downstream from the first section 28a, smaller than the first section 28a to which the clean air 5 is sent; and the third section 28c that contains the aforementioned section 10 to generate an air flow and discharge clean air 5 that has been sent from the second section 28b through the outlet 6.

Between the first section 28a and the second section 28b and between the second section 28b and the third section 28c, dividing walls 29a and 29b exist to section off these. Furthermore, openings 30a and 30b are created to allow the flow of the clean air 5 that has been cleansed through the section 28a and others. At the openings 30a and 30b, multiple current plates 32 are installed to stabilize the flow of the clean air 5 that travels through adjoining sections (e.g., between the first section 28a and the second section 28b). As shown in FIG. 1, between the first section 28a and the second section 28b, the current plates 32 are arranged to be sloped downward toward downstream, while between the second section 28b and the third section 28c, they are sloped upward toward downstream. Thus, the air flow 9 is stabilized and the fine particles 2 that may still exist in a small quantity in the clean air 5 while being transported from the first section 28a may fall downward in the air duct 7 through contact with the current plate 32, thus preventing the release of the particles 2 through the outlet 6.

A current plates 32 with an identical structure and almost identical actions are located between the intake 4 and the discharge section 24 and the collecting section 14. The current plates 32 at the inlet 4 guide contaminated air 3 that has been sucked in to flow downward at an angle downstream, creating a steady stream toward the area where the discharge electrodes 19 are arranged in a vertical direction. Thus, the contaminated air 3 is dispersed within the air duct 7 and kept from reaching the outlet 6 without the effect of a corona discharge. Consequently, the collecting efficacy by the electrostatic precipitator 1 is improved. By placing the current plates 32 at the above-cited three locations to stabilize the air flow 9, vibration and noise, such as wind roar, are minimized during the operation of the electrostatic precipitator 1 because the air flow 9 comes into contact with the site where the flow in the air duct 7 is interrupted. By stabilizing the air flow 9, the flow generating capacity of the air flow generator 10 to generate an air flow is made more efficient, thus saving energy. Furthermore, by turning the air flow 9 to a laminar movement, the discharge efficiency (charging efficacy) by corona discharge (CD) is augmented and the collecting efficiency of the electrostatic precipitator 1 is improved.

For other structural components, the electrostatic precipitator 1 of the present invention has a sloped floor surface 31 that tilts the floor of the housing 8 in a certain direction (tilted downward toward downstream of the air duct 7). Thus when the cleaning fluid 27 is jet-sprayed on the adsorption surface 12 with the aid of the aforementioned washing fluid spraying section 26 and the fine particles 2 are washed off, the cleaning fluid 27 containing the fine particles 2 that has reached the sloped floor surface 31 of the housing 8 is led to waste the fluid retaining section 34 at the lowest section along the sloped floor surface 31. This waste fluid retaining section 34 has a drain (not shown in the figure) that discharges the retained cleaning fluid 27 to the outside of housing 8. This embodiment facilitates recovery of the cleaning fluid 27 after it has been used in cleansing.

As shown in the enlarged views of FIGS. 3 and 4, in the electrostatic precipitator 1 of this embodiment, pointed ends 23 at one end of the discharge electrode 19 that is installed on the charge plate 20 are located so that the ends are placed away from a plate edge section 33 that is located at the charge plate 20 and toward the adsorption axis 11; in other words, these pointed ends 23 are held between pairs of adsorption plates 13. It is known that when a discharge voltage is supplied, a corona discharge (CD) is likely to occur at a pointed section. The fine particles 2 that are charged by a corona discharge tend to revert readily from a charged state to a neutral state. In other words, the action by the Coulomb force gradually weakens after charging. Therefore to adsorb and capture the particles 2 immediately after exposure to the corona discharge CD and resultant charging, the adsorption plates 13 are arranged to be close around the pointed end 23 of the discharge electrode 19 so that the fine particles 2 can be collected before the action by the Coulomb force may be weakened. Here, the ends of the pointed ends 23 of the discharging electrodes 19 are arranged to be equidistant from the adsorption surface 12 of a pair of the adsorption plates 13 that are facing each other (FIG. 3). For the discharge electrode section 19, one end of the discharge electrode 19 corresponding to the reverse side of the pointed end 23 is inserted and fixed in an insertion hole (not indicated in the figure) that has been created in the opposing edge 22 of the inlet of charge plate 20: thus discharge electrode section 19 is formed in a single unit with charge plate 20. In FIGS. 1 and 3, the part that is normally imbedded in the charge plate 20 and not visible are exposed so that the specific manner by which the discharge electrode 19 is imbedded in the charge plate 20 may be shown.

For other structures included in the electrostatic precipitator 1 of this embodiment, the support clamps 36 for suspension support are attached at four corners of the upper surface 35 of the housing to facilitate installation and moving of the electrostatic precipitator 1.

In this example, a discharge voltage of about 10.5 kV is supplied by the discharge voltage supply section 25 that is connected to the discharge section 24. This discharge voltage is transmitted to discharge an electrode 19 via the discharge shaft 17 and the charging plate 20 and creates an electrical differential between the charge plate 20 and the adsorption plate 13, resulting in the development of the corona discharge CD at the pointed ends 23. Because of the development of the corona discharge CD, the components other than the discharge section 24, in particular, the collecting section 14 and the housing 8 are constructed with non-conductive substances such as insulating material 17a so that they will be electrically insulated from discharge means 24; and it is made certain that no discharge voltage is detected at sites other than discharge electrode 19 or no electrical leakage due to high voltage occurs. The collecting section 14 and the housing 8 are connected to a grounding wire (not shown) so that electricity may be allowed to escape into the earth. Therefore the charge from the fine particles 2 that have been collected on the adsorption surface 12 do not remain constantly on the adsorption plate 13 or the collecting section 14. A part of the discharge electrode 19 is buried in the charging plate 20 and the distance between each opposing adsorption surface 12 of the opposing adsorption plate 13 and the pointed end 23 of the discharge electrode 19 is made equal. Consequently, the corona discharge CD against each adsorption surface 12 is made equal. For instance, when fixed on one of the charging surfaces 21 of the charging plate 20 by caulking, it is conceivable that a discrepancy will occur between the pointed end 23 and each adsorption surface 12, altering the development of corona discharge CD. In such an instance, the fine particles 2 that pass between the charge plate 20 and the adsorption plate 13 at the side where the rate of corona discharge CD is low are less efficiently charged and fail to acquire sufficient electrical potential to be adsorbed to the adsorption plate 13; thus the dust collecting efficacy is compromised. However, as described above, the discharge electrode section 19 is arranged with equal distances between pairs of the adsorption surfaces 12; and the problem such as that described above does not occur. In the present embodiment, the discharge electrode section 19 is buried in the charging plate 20 so that they can be produced as a single unit; but the present invention is by no means limited to this embodiment. As long as the discharge electrode section 19 is fixed while remaining equidistant to the adsorption surface 12, other structural embodiments may be adopted.

Because the charging plate 20 and the discharge electrode 19 are formed to match the height and the width of inlet 4, the contaminated air 3 that has been rectified by the current plate 32 and discharged most certainly passes near corona discharge CD generated by the discharge electrode section 19. Consequently, the charging efficiency of the fine particles 2 is raised. Contrary to rotating adsorption plate 13, the charging plate 20 is supported by the discharge axis 17 and the charging plate support axis 18 without rotation; therefore, at about the center of charging plate 20, penetrating a hole section 20a having a diameter greater than the axial diameter of the adsorption axis 11 has been created.

The collecting means 14 having the adsorption plate 13 rotates with the adsorption shaft 11. Thus, while being inserted between the square charging plates 20 that face each other, the adsorption plate 13 can rotate. In other words, the electrostatic precipitator 1 of this embodiment has the charging plate 20 and the discharge electrode section 19 fixated in the air duct 7; however, by rotating adsorption plate 13, it can change at will the positional relationship between the charged particles 2 and the adsorption surface 12 of the adsorption plate 13. Subsequently, the fine particles 2 do not adhere or accumulate at a specific site of the adsorption surface 12 of the adsorption plate 13. In other words, through the adsorption of the fine particles 2 to the adsorption surface 12, the Coulomb force to suction and collect the charged particles 2 is reduced. By adsorbing the fine particles 2 generally evenly on the adsorption surface 12, the electrostatic precipitator 1 can be activated and operated for an extended period without much reduction in its dust-collecting efficacy.

Through the above-described embodiment, the discharge section 24 that is connected to the discharge voltage supply section 25 causes corona discharge CD at the pointed ends 23 of the discharge electrodes 19, while the adsorption plate 13 is in an electrically corresponding state against the discharge electrode 19 with the aid of parts such as a grounding wire. Consequently, the fine particles 2 of the contaminated air 3 that have been positively charged by the action of the corona charge CD repel charging plate 20 having the same electrical potential and move in a direction away from the discharge surface 21, while the adsorption plate 13 that has an electrical charge opposite that of the charged fine particles 2 draws the fine particles 2 to the adsorption surface 12 or exerts an adsorptive action on these fine particles 2.

Furthermore, the electrostatic precipitator 1 of this embodiment is equipped with the cleaning fluid spraying section 26 to physically remove the fine particles 2 that have been adsorbed and collected on the adsorption surface 12 of the adsorption plate 13. This cleaning fluid spraying section 26 contains the main body of the cleaning apparatus that is installed as if to straddle in the direction of the width of the air duct 7 and with a plurality of spray nozzles (not shown); and it sprays the cleaning fluid 27 from the end of the spray nozzles onto the adsorption surface 12 of the adsorption plate 13, washes off the fine particles 2 and performs a cleansing operation. During this cleaning process, the corona discharge CD from the discharge electrode 19 is suspended and the adsorption plate 13 is controlled by the plate rotating motor 16 to rotate around the adsorption shaft 11 so that the cleaning fluid 27 may be sprayed evenly on the adsorption surface 12. The adsorption plate 13 turns at a rotational frequency lower than when the fine particles 2 are collected with the aid of the Coulomb force. As the adsorption plate 13 rotates, the cleaning fluid 27 and the fine particles 2 that adhere to the adsorption surface 12 come under the influence of a centrifugal force, move toward the direction of rotation of the adsorption plate 13 and eventually scatter from the plate edge 33 toward the air duct 7. At this moment, the scattered cleaning fluid 27 and others drop immediately below because of the gravity and reach the sloped floor surface 31 of the housing 8. The cleaning fluid 27 and others that are scattered in the first section 28a are hampered by dividing wall 29a adjacent to second section 28b and do not reach the second section 28b. In addition, the current plate 32 that is arranged to slant downward aids in their move toward the sloped floor surface 31 of the housing 8. Furthermore, the current plate 32 that is arranged obliquely and turning upward between the second section 28b and the third section 28c prevents the cleaning fluid and others from reaching the third section 28c. Thus, the fine particles 2, which have adhered to the adsorption surface 12 are then removed, are isolated from the cleaned air 5 and exhausted through the outlet 6.

Next, the method for using the electrostatic precipitator 1 of this embodiment is explained. First, the air flow generator 10 is operated and the rotating fan is started by the fan-operating motor. The contaminated air 3 is sucked into inlet 4 by the air flow generator 10; and the air flow 9 is generated in the air duct 7 to discharge this as the clean air 5 through the outlet 6. Then, the plate-rotating motor 16 that is connected to the adsorption shaft 11 of the collecting section 14 is operated; the discharge voltage supply section 25 is activated; and the corona discharge CD is created from a plurality of the discharge electrodes 19 via the discharge plate 20.

By conducting the operation described above using the electrostatic precipitator 1, the air flow 9 is generated in the air duct 7 by the air flow generator 10. Thus, the contaminated air 3 is sucked into the inlet 4. At this moment, the flow of the contaminated air 3 is rectified by the current plate 32 that is located downstream from the inlet 4 and is led to the first section 28a where the discharge section 24 and the collecting section 14 are located. Without this current plate 32, the flow 9 of the contaminated air 3 that has been sucked in may become uneven and its direction may form into a turbulent pattern. It has been known that the air flow 9 is highly likely to be dispersed from the inlet 4 heading outward. Therefore, as shown in the electrostatic precipitator 1 of the present embodiment, the flow of contaminated air 3 that has been sucked in through the inlet 4 can be stabilized by a plurality of current plates 32, prevented from being dispersed outward and led to the discharge section 24.

The contaminated air 3 that has passed the current plate 32 travels between the charge plate 20 of the charging section 24 and the adsorption plate 13 of the collecting section 14. At this time, the discharge electrodes 19 of the charging plate 20 are generating the corona discharge CD at the pointed ends 23 due to the charge voltage supplied by the discharge voltage supplying section 25. These discharge electrodes 19 are arranged in a vertical direction in relation to the opposing inlet edge 22 of the charging plate 20 and have multiple plates 20 and the discharge electrodes 19 that are located in the direction of the width. Therefore, almost all of the contaminated air 3 travels around the corona discharge CD. Consequently, the fine particles 2 that are contained in the contaminated air 3 are positively charged by the corona discharge CD. In this instance, the fine particles 2 may be negatively charged by the corona discharge CD.

Here, the discharge voltage (e.g., 10.5 kV) is supplied to discharge electrodes 19 from discharge voltage supplying means 25 via the discharge shaft 17 and the charging plate 20, while the adsorption plate 13 is electrically connected to a grounding wire that is buried in the ground surface via the adsorption shaft 11 and the housing 8. Consequently, a very large electrical field is formed between the discharge surface 21 and the adsorption surface 12. Thus, the corona discharge CD is released from the pointed ends 23 of the discharge electrode 19 and the fine particles 2 that have passed around the corona discharge CD become electrically charged. At this moment, the adsorption plate 13 is rotating at a set rotation frequency (e.g., 500 rpm) with the adsorption shaft as its axis (see arrow A of FIG. 3). In other words, the position of the adsorption surface 12 (where fine particles 2 are repelled by the charging plate 20 then drawn by the Coulomb force) is constantly changing.

Consequently, the fine particles 2 can be collected evenly across the entire adsorption surface 12 of the adsorption plate 13. If a large quantity of the fine particles 2 adheres to the adsorption surface 12 and aggregates in one place, the action of the adsorptive force may be compromised by such adherent fine particles 2. However, the adsorption plate 13 of the electrostatic precipitator 1 of the present application embodiment allows adsorption of the fine particles 2 evenly on the adsorption surface 12 and, compared with an instance when localized aggregation has occurred, a drop in the Coulomb force has a less significant effect. Furthermore, the fine particles 2 that have collected on the adsorption surface 12 are affected by a centrifugal force in the direction of the rotating periphery due to the rotation of the adsorption plate 13. Thus, the fine particles 2, together with those particles around them, move toward the circumference; and when the aforementioned centrifugal force exerts a stronger impact against the adsorptive force to the adsorption surface 12, the fine particles 2 are scattered away from the adsorption surface 12. Then, the fine particles 2 join those particles around them, gaining in weight and size over those when they were first collected. Consequently, it becomes difficult for them to float in the clean air 5 that has been purified and gravity causes them to drop toward the sloped floor surface 31 of the air duct 7. In this manner, the fine particles 2 are not mixed with the clean air and it is possible to remove the fine particles 2 that have been adsorbed on the adsorption surface 12 even during the operation of the precipitator. Compared with conventional electrostatic precipitators, the present embodiment can be operated for many hours without cleaning or exchanging the collecting section 14. Therefore it is suitable for use in the kitchen of a restaurant where long hours of operation are mandatory.

The pointed ends 23 of the discharge electrodes 19 are set back from the plate edge 33 of the adsorption plate 13 and toward the adsorption shaft 11; so the pointed ends 23 are surrounded by the adsorption plates 13 that oppose each other; and the fine particles 2 that have been charged by the corona discharge CD originating at the discharge electrodes 19 are collected immediately on the surrounding adsorption surface 12 of adsorption plate 13 that are close to the discharge electrodes 19. Consequently, the charged fine particles 2 are collected by the adsorption plate 13 without fail.

The clean air 5, from which the fine particles 2 have been removed in the first section 28a passes the second section 28b, and the third section 28c, is released outside through the outlet 6. The fine particles 2, which have been scattered again from the adsorption surfaces 12 onto the air duct 7 by the rotation of adsorption plates 13, drop downward by gravity in the second section 28b and the third section 28c before they mix with the clean air 5 and are discharged via the outlet 6. In this way, the clean air 5 is not re-contaminated with these fine particles. Furthermore, the fine particles 2 are kept from being sent to the sections 28b and 28c downstream by the current plates 32 of the openings 30a and 30b that are created in the sectioning walls 29a and 29b to divide the sections 28a, 28b, and 28c. Thus, the purity of the clean air 5 that is released from the outlet 6 is further improved.

The electrostatic precipitator 1 of this embodiment is equipped with the cleansing fluid spraying means 26 that is capable of spraying the cleansing fluid 27 on the rotating adsorption plates 13. By employing this device, the fine particles 2 that have been collected on the adsorption surfaces 12 can be washed off. The manner of cleaning by using the cleansing fluid spraying section 26 and the cleansing solution 27 has already been stated so their explanation is omitted here.

The present invention have been explained above with reference to the preferred embodiments; however, the present invention is by no means limited to these embodiments, and various improvements and modifications are possible without departing from the scope of this invention.

The electrostatic precipitator where the present invention is applied presented a roughly rectangular electrostatic precipitator 1 in which a straight linear air duct 7 is created from the front to the back. However, the application is not limited to this form: in accordance with the situation where it is located, the form of the air duct 7 may be altered. Specifically, it may have an L-shaped air duct where an inlet 4 may be located in front and an outlet 6 on its upper surface. Needless to add, the value for the discharge voltage that is supplied by a discharge voltage supply section 25 may be changed according to the characteristics of the fine particles to be charged, the number of rotations of the adsorption plates 13 and other related factors.

In the electrostatic precipitator 1 where the present invention is applied, some of a plurality of the discharge electrodes 19 against the charging plate 20 are buried to form a single unit. The embodiment is by no means limited to this; for example, the discharge electrodes 19 may be arranged to be independent of the charging plates 20. Alternatively, multiple discharge electrodes may be installed and the support plates for them may be located between the inlet 4 and the plate edge 33 of the charging plate 20. By employing these embodiments, the electrostatic precipitator may be designed to suit the shape of the air duct from the inlet 4 to the adsorption plate 13.

INDUSTRIAL APPLICABILITY

As described above, the electrostatic precipitator of the present invention is capable of purifying industrial waste gases expelled from factories and mist discharged from the kitchens of restaurants by using a corona discharge. In particular, it can be produced in a compact form and is suitable for home use and commercial use at facilities such as restaurants.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. An electrostatic precipitator comprising
   a housing having an air duct that is formed inside for communication between an inlet for sucking contaminated air containing fine particles and an outlet for discharging resulted cleaned air after removing said fine particles,
      a air flow generating means for generating an air flow in the air duct for said sucking contaminated air and discharging clean air,
      a discharge means that is formed in the aforementioned air duct and charges by corona discharge (CD) said fine particles that are contained in said contaminated air,
   a collecting means that is formed in said air duct and collects using the Coulomb force said fine particles that had been charged by said discharge means,
   and a discharge voltage supplying means that is electrically connected to said discharge means and supplies the discharge voltage that enables said CD,
      wherein said collecting means comprises:
   an adsorption shaft that bridges said air duct perpendicular to a direction of said air flow,
      a plurality of adsorption plates that are generally discoid, installed on said adsorption shaft while the adsorption surfaces oppose each other, adsorb and collect said fine particles on said adsorption surface by using the Coulomb force,
      and an adsorption plate rotating means that is connected to one end of said adsorption shaft and rotates said adsorption plates along said adsorption shaft;
      and said discharge means comprises:
      a discharge axis that is electrically connected to said discharge voltage supplying means,
      a plurality of charging plates that are supported by said discharge axis, inserted between a pair of said adsorption plates that oppose each other, has discharge surfaces approaching the adsorption surfaces of the adsorption plates, and arranged while being electrically insulated from the adsorption plates;
      and a plurality of discharging electrodes that are fixed and project from the opposing edge of said inlet of the charging plate to said inlet and have pointed ends that are formed at the ends.

2. The electrostatic precipitator according to claim 1, wherein said pointed end of the discharge electrode is set back at the side of the adsorption shaft away from the plate edge of the adsorption plate.

3. The electrostatic precipitator according to claim 1, wherein said air duct is sectioned by a first segment that is connected with the air duct and contains the discharge means and collecting means; a second segment to which the clean air that has been cleaned in the first segment is sent; and a third segment that houses the air flow generating means and exhausts the clean air sent from the second segment through the outlet.

4. The electrostatic precipitator according to claim 1, wherein said pointed ends of the discharge electrode are arranged, while maintaining an equal distance from the adsorption surfaces of the pair of the adsorption plates with the pointed ends.

\* \* \* \* \*